United States Patent [19]

Schmidt

[11] 3,768,832
[45] Oct. 30, 1973

[54] CRASH RESTRAINING ACTIVATING SYSTEM

[75] Inventor: Eckart W. Schmidt, Bellevue, Wash.
[73] Assignee: Rocket Research Corporation, Redmond, Wash.
[22] Filed: June 14, 1971
[21] Appl. No.: 152,626

[52] U.S. Cl........ 280/150 AB, 73/517 AV, 73/519, 200/61.53, 180/103
[51] Int. Cl............................................. B60r 21/08
[58] Field of Search.................. 280/150 B, 150 AB; 180/82.3, 103, 104; 200/61.45, 61.53; 73/513 R

[56] References Cited
UNITED STATES PATENTS

| | | | |
|---|---|---|---|
| 2,834,606 | 5/1958 | Bertrand | 280/150 AB |
| 2,944,804 | 7/1960 | Persson | 73/517 R X |
| 3,172,684 | 3/1965 | Isaac | 280/150 AB |
| 3,483,759 | 12/1969 | Venetos et al. | 73/517 R |
| 3,618,978 | 11/1971 | Klove et al. | 280/150 AB |
| 3,632,133 | 1/1972 | Hass | 280/150 AB |

Primary Examiner—Kenneth H. Betts
Assistant Examiner—John P. Silverstrim
Attorney—John O. Graybeal et al.

[57] ABSTRACT

A crash restraint device for an automobile comprising an inflatable bag mounted forward of the automobile passenger seat. A bag inflating device comprising either a chemical composition which upon ignition by an electric current undergoes combustion to supply an inflating gas, or a container of compressed gas which is opened by electrically activated opening means. An electrical current generator responsive to crash impact comprising a magnetized inertial mass in proximity to an inductance coil. Upon crash, the inertial mass passes through the inductance coil to generate a current which in turn initiates inflation of the bag. There are forward bags and side bags activated by, respectively, a forward impact oriented generator and lateral impact oriented generators.

7 Claims, 5 Drawing Figures

Patented Oct. 30, 1973 3,768,832
FIG. 1
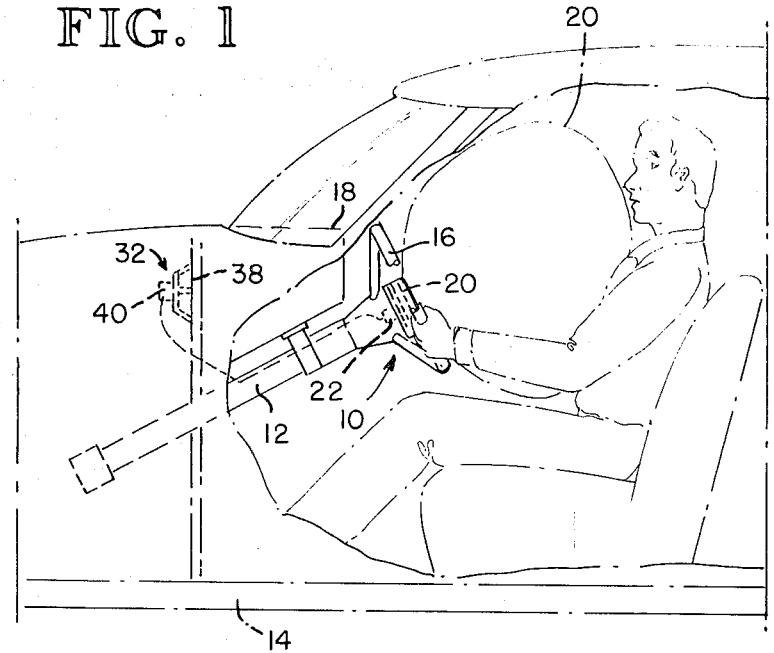
FIG. 3
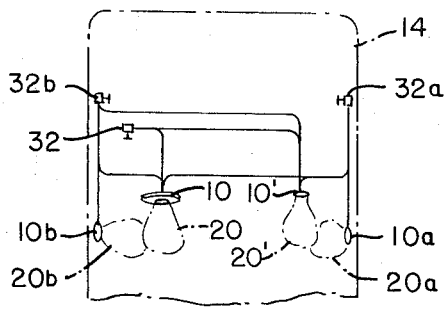
FIG. 2
FIG. 5
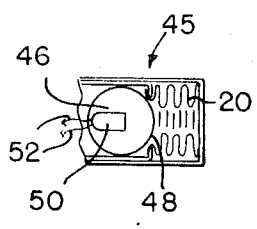
FIG. 4
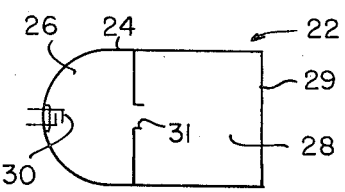
INVENTOR.
ECKART W. SCHMIDT
BY Graybeal, Cole & Barnard
ATTORNEYS

CRASH RESTRAINING ACTIVATING SYSTEM

BACKGROUND OF THE INVENTION

1. Field of the Invention

This invention relates to a crash restraint device in which a bag is inflated to prevent a passenger in an automobile from being thrown violently against the steering wheel, dashboard or other automobile structure, and more particularly to an improved apparatus and method for initiating inflation of the bag.

2. Description of the Prior Art

There are in the prior art various devices which cause a protective bag to inflate in front of a driver or passenger to cushion him from impact with the steering wheel, dashboard or other vehicle structure. Usually the device is activated by an inertial switch responsive to a crash impact of the automobile, which in turn imparts a voltage from an automobile battery to activate an inflating device to quickly inflate the collapsed bag into its inflated position deployed in front of the passenger or driver. The inflating gas is generally supplied either from a source of compressed gas or from a chemical composition which reacts to provide a combustion gas mixture which is the inflating gas.

A variety of such inertial switches is shown in the prior art. U.S. Pat. No. 3,336,045 to Kobori has an inertial switch which closes a circuit from the automobile battery to ignite a charge of black powder to produce inflating gases. Other inertial switches which perform a similar function are shown in the following patents: U.S. Pat. No. 2,903,533 to Weaver; U.S. Pat. No. 3,389,275 to Brothers; U.S. Pat. No. 3,552,768 to Kaiser; U.S. Pat. No. 3,485,973 to Kaiser; and U.S. Pat. No. 3,549,169 to Oldberg.

Also known in the prior art are acceleration sensors which have an inertial mass connected to a restraining spring. The greater the acceleration, the greater the displacement of the inertial mass, and this displacement is detected by a coil winding. Examples of such sensors are U.S. Pat. No. 3,519,987 to Jania; U.S. Pat. No. 3,474,680 to Babson et al. and U.S. Pat. No. 3,483,759 to Venetos et al.

Yet another prior art patent, U.S. Pat. No. 3,259,769 to Stott discloses an electrical pulse generator that converts mechanical energy into electrical energy by the sudden linear motion of a plunger type armature caused by the rapid application of a fluid (gas) pressure, resulting, for example, from a pressure derived from a gun firing operation. The magnetic plunger generates an electrical pulse in an adjacent coil.

One of the problem areas in the prior art crash restraint activating systems is that they depend upon the automobile battery to supply the activating voltage. If the crash would be such to cause breaking of the battery circuit prior to activating the inflating system, the system would be inoperative. Likewise, if there was a secondary inflating system which upon delayed or secondary impact activates an inflating system, the initial impact may disrupt the circuitry from the automobile battery and thus render the system inoperative.

SUMMARY OF THE INVENTION

In the present invention there is a crash restraint inflatable (i.e., bag) which is inflated (for example, from a chemical gas generator or a compressed gas source) upon activation by an electrical signal. There is a magnetized inertial mass mounted in proximity to an inductance coil which in turn is connected to the electrically activated ignition system for the inflating device. On crash impact, the magnetized inertial mass has at least two poles which are arranged to pass by the current generator in sequence so that two activating current pulses are initiating as a redundant safety factor. Also, in a further embodiment there are two current generators responsive to lateral crash impact so as to selectively inflate side bags to protect against lateral crash impact. Dr

BRIEF DESCRIPTION OF THE DRAWING

FIG. 1 is a side elevational view showing the system of the present invention;

FIG. 2 is a view partially in section showing the current generator of the present invention;

FIG. 3 is a semi-schematic view showing an embodiment where lateral impact current generating devices are used in addition to a forward impact generating device for selective inflation of side crash restraint bags;

FIG. 4 is a semi-schematic view of a chemical combustion inflating device; and

FIG. 5 is a semi-schematic view of a compressed gas generating device.

DESCRIPTION OF THE PREFERRED EMBODIMENT

With reference to FIG. 1, the crash restraint device 10 of the present invention is shown mounted on a steering column 12 of an automobile 14 having a steering wheel 16 and dashboard 18. The apparatus 10 comprises an inflatable bag 20, which in FIG. 1 is shown in full lines in its collapsed position and in dotted lines in its inflated position. A gas generating device 22 is located proximate to the bag 20 and functions to provide gas for the inflation of the bag 20.

The unit 22 comprises a housing 24 having a combustion chamber 26 and a coolant chamber 28 closed by a rupturable diaphragm 29. There is an electrically activated igniter 30, which causes combustion of the chemical composition in chamber 26. The combustion products from the chemcial composition pass through a nozzle 31, through the cooling chamber 28, rupturing the diaphragm 29, to provide an inflating gas for the bag 20. The chemical composition can be a mixture of 80% sodium azide and 20% potassium perchlorate. Between the composition and the nozzle there can be a bed of alumina or silica to remove undesired components from the combustion gases. The coolant chamber can contain a liquid halocarbon, such as perfluorocyclobutane.

The crash responsive current generating device of the present invention is generally designated 32 and comprises an inertial slug or mass 34 which is magnetized in a manner that its opposite poles are located at its front and rear end. This inertial mass 34 is connected by a breakable connection 36 to the automobile frame 38. Located forwardly of the magnetized mass 34 is an induction coil 40 having a center through opening 42 therein. The current generating device 32 is so arranged that the through passage 42 is longitudinally aligned (i.e., in a forward direction) with the inertial mass 34 which is positioned immediately behind the inductance coil 40. In circumstances of ordinary acceleration and deceleration of the automobile 14, the accelerating forces on the mass 34 will not be sufficient to break the connection 36. However, in a crash impact situation which generates a decelerating force of a predetermined value, the connection 36 will break to permit the inertial force on the mass 34 to cause it to pass through the inductance coil 40. This will cause a first voltage to be applied to the coil 40 by the passage of the first pole of the magnetized mass 34, and then a second opposite voltage to be imposed across the coil 40 as the second pole of the mass 34 passes through the coil 40. The two leads 44 of the coil 40 are connected to the igniter 30. Thus, an activating pulse current is caused to pass from the coil 40 to the igniter 30 to cause combustion of the chemical composition in chamber 26 and cause inflating of the bag 20, and a second current pulse is also initiated as a redundant safety factor.

Other inflating systems responsive to electric current can be used such as that shown in FIG. 5, which is a typical configuration of a compressed gas inflating system 45. There is a compressed gas source 46 comprising a cylindrical container 48. There is a suitable ignition charge 50 which upon being activated by an electric current through wires 52 will cause rupturing of the container 48 and release of the compressed gas therein. This could be a unit such as shown in U.S. Pat. No. 3,411,807 to Carey et al. The bag 20 is mounted forwardly of the compressed gas source 46, which is mounted at the head of the steering column 12.

As in the prior embodiment in a crash situation the mass 34 causes a voltage in the coil 40 to activate the ignition charge 50 which ruptures the compressed gas container 46.

FIG. 3 shows a further embodiment, wherein there is a first crash impact current generator 32 disposed to be activated by a head-on collision, as indicated above. In addition, there is right-hand crash impact current generator 32a disposed to be activated by a lateral crash impact from the right. There is a third current generator 32b at the left-hand side of the automobile 14, to similarly to activated by a crash impact from the left-hand side of the car. In addition to the forward crash restraint device 10 having a bag 20 there is a right-hand lateral crash restraint device 10a having a bag 20a (shown in its inflated position in dotted lines) and a left-hand crash restraint device 10b having a bag 20b (again shown in its inflated position in dotted lines). In addition a forward crash restraint unit 10' with a bag 20' is shown in front of the right-hand passenger seat.

The generator 32 is operatively connected to the two forward crash restraint devices 10 and 10'. The right-hand current generator 32a is operatively connected to the right-hand crash restraint unit 10a as well as the forward units 10 and 10'. The left-hand current generator 32b is operatively connected to the forward units 10 and 10', as well as the left-hand unit 10b. Upon forward crash impact, the generator 32 causes inflations of the two bags 20 and 20' as described above. Upon lateral impact, one or the other of the generating units 32a or 32b inflates, respectively, the bag 20a or bag 20b, in addition to the forward bags 20 and 2'.

What is claimed is:

1. In an occupant carrying vehicle having an occupant carrying location and structure spaced from said location, a crash restraint system for protecting an occupant in said location from impact with said structure, said system comprising:
   a. a collapsed inflatable so disposed and mounted in said vehicle that upon being inflated the inflatable is positioned between said structure and said occupant carrying location;
   b. a gas source to supply an inflating gas for the inflatable;
   c. an electrically actuated initiating device for said gas source to cause said gas source to provide gas to inflate said bag, and
   d. means to generate an electric current to activate said gas source initiating device, said current generator means comprising:
      1. a magnetized inertial mass, a releasable connection mounting said mass in the vehicle in a manner such that upon crash impact of a predetermined value said releasable connection releases said mass and said inertial mass is caused to travel a predetermined activating path;
      2. an inductance coil so disposed relative to the path of the inertial mass that a voltage is induced in said coil by movement of the inertial mass on its path, and
      3. conducting means to connect said coil to the gas source initiating device, in a manner that upon crash impact a voltage is imposed from said coil across said initiating device to actuate said initiating device so that said gas source is caused to inflate said inflatable.

2. The apparatus as recited in claim 1, wherein said inertial mass has at least two magnetic poles arranged to pass in sequence by the inductance coil so as to generate two voltages in sequence in the inductance coil so as to provide safety redundant activating pulses to the activating device.

3. The apparatus as recited in claim 1, wherein said gas source comprises a chemical composition which reacts to provide combustion products which inflate said bag, and said initiating means comprises an igniter which initiates combustion of said composition.

4. The apparatus as recited in claim 1, wherein said gas source comprises a container of compressed gas, and said initiating means comprises electrically activated opening means to open said compressed gas container.

5. The apparatus as recited in claim 1, wherein there is a first current generator arranged to be responsive to velocity changes of the vehicle in a forward direction and arranged to initiate inflation of a forward crash restraint bag, and there is a second current generator arranged to be responsive to a velocity change in a lateral direction, and arranged to cause inflation of a lateral crash restraint inflatable.

6. The apparatus as recited in claim 5, wherein said second current generator also causes inflation of said forward crash restraint inflatable.

7. The apparatus as recited in claim 1, wherein said coil defines a center passageway, and said magnetized inertial mass is disposed to travel through said center passageway in response to crash impact.

* * * * *